United States Patent [19]

Fortmann

[11] Patent Number: 5,399,827
[45] Date of Patent: Mar. 21, 1995

[54] METHOD AND DEVICE FOR DETERMINING THE TEMPERATURE AT A SPOT-WELDED JOINT AND A METHOD FOR ASSESSING THE QUALITY OF A SPOT-WELDED JOINT

[75] Inventor: Manfred Fortmann, Much, Germany

[73] Assignee: Siemens Aktiengesellschaft, Munich, Germany

[21] Appl. No.: 180,708

[22] Filed: Jan. 13, 1994

Related U.S. Application Data

[63] Continuation-in-part of Ser. No. 74,328, Jun. 9, 1993, abandoned.

[30] Foreign Application Priority Data

Dec. 13, 1990 [DE] Germany .............. 40 39 847.1
Apr. 18, 1991 [DE] Germany .............. 41 12 732.3

[51] Int. Cl.⁶ .............................................. B23K 11/25
[52] U.S. Cl. ........................................................ 219/109
[58] Field of Search ................................. 219/109, 110

[56] References Cited

U.S. PATENT DOCUMENTS 3,800,119 3/1974 Kuroda et al. .

FOREIGN PATENT DOCUMENTS 0350013 1/1990 European Pat. Off. .
7223324 6/1972 Germany .
252778 12/1987 Germany .............. 219/110
268648 6/1989 Germany .............. 219/110
1558609 4/1990 U.S.S.R. .

OTHER PUBLICATIONS

Welding Journal No. 5 (Alcini), May 1990, pp. 177–180, "Experimental Measurement of Liquid Nugget Heat . . .".

DVS–Merkblätter Widerstandsschweisstechnik, pp. 36–43, "Electrodes for Resistance Welding Technique".

Das Elektrische Widerstandsschweissen, Walter Brunst, 1952, pp. 80–92, "Electric Resistance Welding".

Primary Examiner—Clifford C. Shaw
Attorney, Agent, or Firm—Herbert L. Lerner; Lauarence A. Greenberg

[57] ABSTRACT

The temperature is determined at a spot weld. The spot weld is between parts to be welded to one another. The parts are formed of a first metal and the spot weld is made with an electrode of a second metal placed in contact with the parts. The thermoelectric voltage between parts and the electrode is measured and the temperature is determined from the thermoelectric voltage measured in the measuring step. A device for determining the temperature includes a voltmeter connected between the parts to be welded and the electrode. The temperture determination is utilized in assessing the quality of spot-welded joints in automated manufacture, for example in the automobile industry.

10 Claims, 3 Drawing Sheets

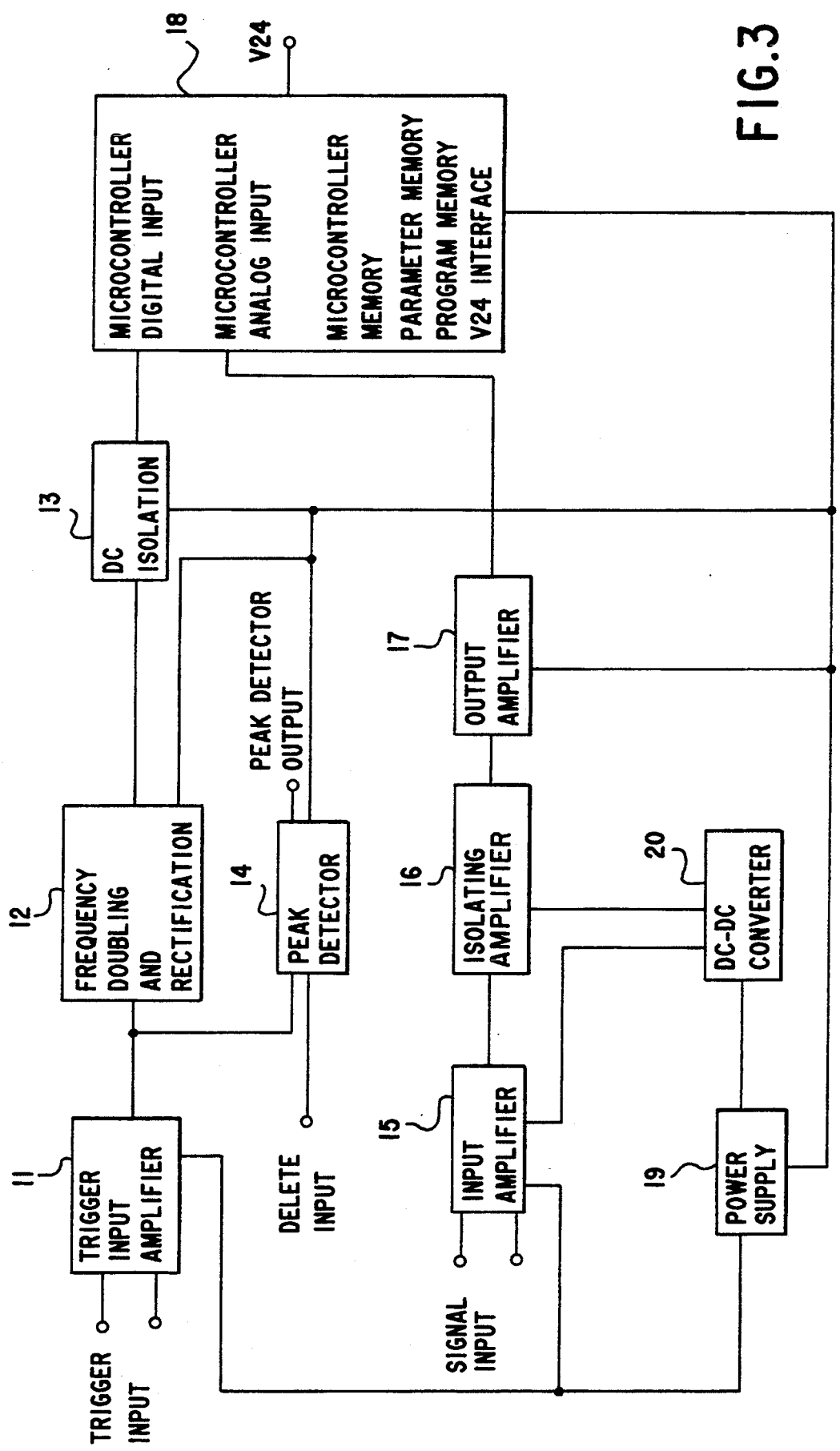

METHOD AND DEVICE FOR DETERMINING THE TEMPERATURE AT A SPOT-WELDED JOINT AND A METHOD FOR ASSESSING THE QUALITY OF A SPOT-WELDED JOINT

CROSS-REFERENCE TO RELATED APPLICATION

This application is a continuation-in-part of application Ser. No. 08/074,328, filed Jun. 9, 1993, now abandoned, which was a continuation of international application Ser. No. PCT/DE91/00972, filed Dec. 13, 1991.

BACKGROUND OF THE INVENTION

Field of the Invention

The invention relates to a method for determining a temperature at a spot weld between two parts of a first metal to be welded to one another, the joint being produced with an electrode of a second metal which is placed in contact with at least one of the parts to be welded. The invention further relates to a method and an apparatus for performing the method in examining the quality of the spot-welded joint.

Spot welds are in widespread use, for example in automobile construction, where metallic parts, preferably sheet-metal parts, are intended to be joined to one another. Preferably, when the spot-welded joint is not only intended to be used for a temporary bonding together of the parts but represents the final joint between the parts, it must be ensured that the joint can withstand the operating loads. The determining factor of the quality of such a spot weld is adequate heat development and an adequate molten pool size under the electrodes. For example, if the welding current flows through shunt paths, that can lead to so-called dry joints having inadequate strengths. The requirement exists, primarily in the course of automated manufacturing processes, for an examination of the quality of such spot welds, which can be carried out at a lower cost in terms of time and equipment than the methods which are intrinsically possible and are otherwise used for material testing (for example by means of X-rays or ultrasound). It is known for sample inspections to be carried out by forcibly tearing apart such welded joints.

An article entitled "Experimental Measurement of Liquid Nugget Heat Convection in Spot Welding" by W. V. Alkini, in Welding Journal, vol. 69, 1990; No. 5; Miami, Fla., describes the temperature distribution within a molten nugget at an AC spot weld. The measurement is performed with a plurality of micro-thermocouples with a very short response time disposed at the spot weld location. A temperature curve at the spot weld is determined with each micro-thermocouple. The use of thermocouples at the spot weld is not suitable in determining the temperature at a plurality of spot welds, for instance during an automatic manufacturing process, however, particularly because of excessive demands in terms of equipment and measurement technology as well as because of time constraints.

The German Gebrauchsmuster DE-GM 72 23 324 describes a device for monitoring electrical resistance welds with a welding apparatus which provides for at least one electrode contacting the material to be welded. The device includes a heat radiation sensor which is directed at a spot weld and which has an evaluation unit connected downstream thereof. The heat radiated from the spot weld during the welding operation is received by the heat radiation sensor and from that there is derived a control signal, in particular the temperature at the spot weld. The temperature at the spot weld is exclusively determined during the welding operation and it is compared with a minimum temperature and a maximum temperature. When the temperature lies between the minimum and the maximum temperatures, then the welded joint produced by the welding operation is characterized as satisfactory. The heat radiated after the welding operation is measured and evaluated only for the purpose of preparing the evaluation device for a new measurement.

U.S. Pat. No. 3,800,119 to Kuroda et al. describes a device for monitoring the quality of a spot weld between two steel plates to be welded to one another, whereby the spot weld is produced by means of two mutually oppositely disposed welding electrodes. In that device, only information obtained during the welding process is used for determining its quality. Such determination is based on the high welding voltage measured between the welding electrodes during the welding process. The difference between the weighted maximum value of the welding voltage and the value of the welding voltage at the end of the welding process serves as the basis for determining the quality.

The Soviet inventor's certificate SU 1558-609 A describes a spot weld monitoring device. The device includes two adjacently disposed welding electrodes which are in contact with one of two parts to be welded to one another. After the welding operation, each of the electrodes form a thermocouple with that object. The two measured thermal voltages are compared. If the thermal voltages correspond to one another, a spatially constant temperature distribution at the spot weld is presumed. Accordingly, the device only serves to monitor the spatial constancy of the temperature at a spot weld, without knowing the actual temperature, or the actual temperature difference.

SUMMARY OF THE INVENTION

It is accordingly an object of the invention to provide a method and a device for determining the temperature at a spot-welded joint and the use of the method in assessing the quality of the spot-welded joint, wherein the method for determining the temperature at a spot weld may be performed immediately after each welding operation and at a comparatively smaller expense. The method should furthermore be possible to be performed without sensitive measurement instruments disposed in the immediate vicinity of the spot weld. It is another object of the invention to provide an apparatus for performing the method and, finally, it is also an object of the invention to provide a method for determining the quality of a spot weld with destruction-free monitoring.

The first above-mentioned object is solved, in general terms, in that a thermoelectric voltage is measured at the spot weld between two parts of at least one first metal to be welded to one another and an electrode forming the spot weld which is made from a second metal and which is placed in contact with at least one of the parts, and that the temperature is determined therefrom.

With the objects of the invention in view, there is provided, in accordance with the invention, a method for determining a temperature at a spot weld between parts welded to one another, whereby the parts are formed of at least a first metal and the spot weld is formed with an electrode of a second metal placed in contact with at least one of the parts, which method comprises:

measuring a thermoelectric voltage between parts joined with a spot weld and an electrode for forming the spot weld placed in contact with at least one of the two parts; and determining a temperature at the spot weld from the thermoelectric voltage measured in the measuring step.

After the completion of the welding, the welding current is disconnected and the electrode as well as the workpiece itself, which are composed of different metals, then act as a thermocouple. The voltage which is then induced is different depending on the metals being used and, in the case of welding steel (that is to say iron) parts with the aid of a copper electrode (under some circumstances with additives of chromium and zirconium) which is preferably considered, is approximately 1 mV per 100 K. of temperature which the welding point still exhibits at this point in time.

In accordance with a further mode of the invention, in the case of normal methods that are carried out by using two electrodes which are located opposite one another on opposite sides of the parts and at the same time come into contact with the parts, there is provided a method in which the temperature is determined from the mean value of the voltages measured separately on each electrode. In consequence, parasitic thermal voltages, for example on the iron side, and any small leakage currents of the welding current, which is disconnected during the measurement, are compensated for.

Preferably, the temperature is determined via a reference curve, in which the temperature is provided as a function of the thermoelectric voltage. When the type of metal of the electrode and the type of metal of the part adjoining the electrode are known, then the reference curve can possibly be read from the pertinent literature. Oftentimes, however, the exact composition of the metals is not known, so that the reference curve is established from a reference welding process. For that purpose, a highly accurate and normed thermocouple is disposed at the welding location, and the temperature measured with that thermocouple may be unambiguously assigned to the thermoelectric voltage measured between the electrode and the parts.

In accordance with a further mode of the invention, a course of the temperature over time is determined and it may be recorded.

It is advantageous if the thermoelectric voltage between the part and the at least one electrode which is induced by the gradually decreasing temperature at the welding location is measured at various times, but at least twice. A time function of the temperature is determined through the measured thermoelectric voltage. A function of the temperature over time, particularly a curve of the temperature decrease, may be graphed at a plurality of times through a measurement of the thermoelectric voltage.

In accordance with an additional mode of the invention, the method for determining the temperature is utilized in assessing the quality of a spot-welded connection between the two parts; that method comprises performing the measuring and determining steps at least twice at different times or continuously during a discrete time period and assessing a quality of the spot weld from the course of the temperature thus determined. A quality of a spot weld is assessed from the course of the temperature over time. The quality of the spot weld is judged to be worse, the faster the temperature decreases and the more the course of the temperature deviates from a straight line.

In accordance with an additional mode of the invention, the quality assessment is based on values of a welding voltage and of a welding current measured during welding in conjunction with the course of the measured temperature drop; and assuming that the quality is poorer, if the quotient of the determined temperature drop and a supplied power is smaller.

In accordance with another mode of the invention, a trigger signal used for starting a measurement of the thermoelectric voltage and a measured value of the thermoelectric voltage are fed to an evaluation unit, and the measured value is correlated with parameters stored in the evaluation unit.

In other words, the quality of the spot weld is preferably judged on the basis of the temperature which has been recorded at at least two points in time. In practice, if will suffice to determine the temperature at only two points, taken that the second point is planned such that in a diagram representing the curves of the temperatures over time for different spot welds are spread apart at a maximum.

In a further embodiment of the invention, the curve of the temperature over time for a predetermined time period is used as the basis for judging the quality; the quality of the spot weld is thereby presumed to be worse, the faster the temperature decreases and the more the curve deviates from a straight line.

If the material between the electrodes has been sufficiently liquefied, and a satisfactory welded joint is thus produced, then the mass of the molten metal will cool relatively slowly and, above all, continuously. In other words, the behavior of the temperature curve will be approximately linear. However, an upward bulge of the curve must be expected in the temperature region in which the latent heat of solidification is released. The influence of the temperature drop in the surrounding remaining solid regions of the parts which are to be joined, drops back in comparison. However, if no joint has been produced at all, as a result of fusion having failed to occur, the behavior of the temperature drop is then faster and more parabolic without it being possible for delay to occur in the same as a result of the latent heat of solidification not being released at all. Between these two extreme cases, there are a vast number of temperature drop curves which reflect only partial fusion of the parts to one another. The limit below which the relevant welded joint is to be regarded as unacceptable is based on the discretion of the person skilled in the art. The measures to be taken for quality assurance in this respect (repetition of the welding or sorting out the workpiece as scrap) can then take place even in an automated manner, as is familiar to the person skilled in the art. In this case, the measurement instruments which are required for detecting the thermoelectric voltages can be disposed remote from the welding point, and the loads which occur there as a result of high temperature or vapors, etc. are thus avoided. The result of the following quotient can be used as a quality evaluation scale $$\frac{T_0 \cdot (t_1 - t_0)}{T_0 - T_1}$$

where $T_0$ is the temperature determined at the first point in time $t_0$ after welding and $T_1$ is the temperature determined at a second point in time $t_1$. The favorable value for $(t_1 - t_0)$ must be determined experimentally and may typically be approximately 25 ms.

In accordance with another mode of the invention, there is provided a method in which the values of the welding voltage U and of the welding current I measured in a known manner during the welding are used in conjunction with the behavior of the measured temperature drop as the basis of the quality assessment. The supplied power $P = U \times I$ (for DC current) can be stored in a computing device and can subsequently be correlated with the newly determined temperature values, with the limiting values which are to be regarded as being permissible, for example for different sheet-metal thicknesses or material batches, for the quotient $$\frac{T_0 - T_1}{P}$$

having to be determined empirically.

In this context, a low quotient means that (for example as a consequence of scale or dirt on the workpiece surface) the current flow between the electrode and the workpiece has been impeded.

The evaluating apparatus may also include a device which indicates the drop in the voltmeter reading between the start and the end of the at least one defined time interval.

With the objects of the invention in view, there is also provided, in accordance with the invention, in the context of an apparatus for producing spot-welding joints in parts being formed of at least a first metal by a welding electrode being formed of a second metal and being brought into contact with at least one of the parts welded to one another, a device for determining a temperature at a spot weld between the parts to be welded to one another, comprising means for measuring a voltage connected between the welding electrode and the parts welded to one another. The voltage measuring means are preferably formed as a voltmeter. The device may further include a) a trigger emitting a signal upon completion of a welding process; b) a time transmitter for defining a start and an end of at least one defined time interval after the emission of the signal upon completion of the welding process; and c) an evaluation device for evaluating the temperature at the spot weld.

Other features which are considered as characteristic for the invention are set forth in the appended claims.

Although the invention is illustrated and described herein as embodied in a method and a device for determining the temperature at a spot-welded joint and the use of the method for assessing the quality of the spot-welded joint, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

FIG. 3 is a block circuit diagram of the device which is used for evaluating the signals.

DESCRIPTION OF THE PREFERRED EMBODIMENT

Figure 1:
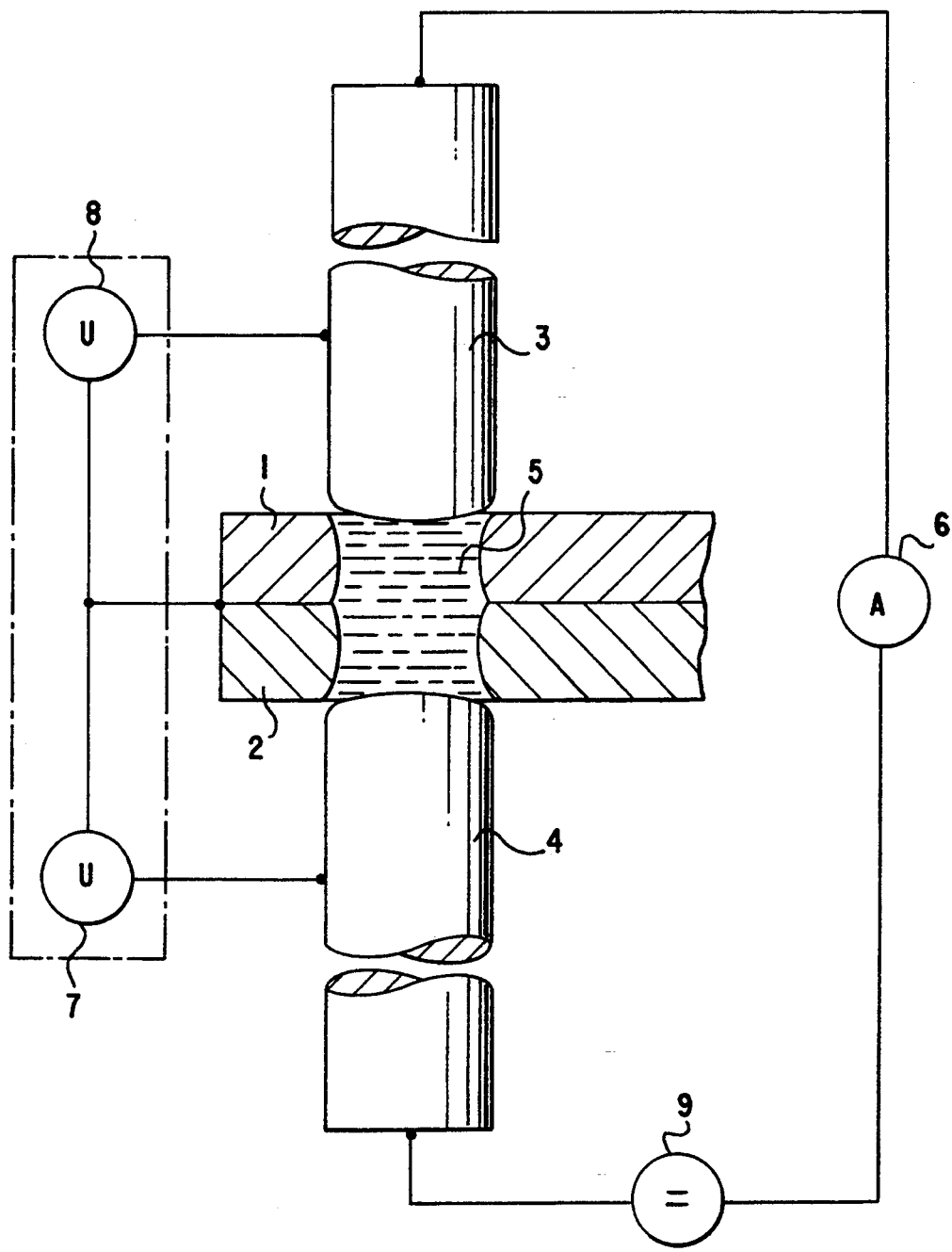
FIG. 1 is a fragmentary, diagrammatic, partly elevational, partly sectional and partly schematic view of a device which is intended for carrying out the method.

Referring now to the figures of the drawing in detail and first, particularly, to FIG. 1 thereof, there are seen two steel plates 1, 2 that are joined to one another by means of a spot weld, through the use of two copper electrodes 3, 4 which are located opposite one another and are brought into contact with the pressed-together steel plates 1, 2. At this point, a current, for instance a DC current, is applied thereto with the aid of a known welding current source 9, which leads to heating and finally to fusion at a welding point 5, as a result of which the steel plates 1, 2 are permanently joined to one another. The intensity of the welding current is measured with the aid of an ammeter 6, and its voltage is measured by two voltmeters 7, 8. After completion of the welding process, each of the voltmeters 7, 8, which are expediently provided with a measurement range changeover for this purpose, are connected on one hand to one of the electrodes 3, 4 and on the other hand to the steel plates 1, 2. A thermoelectric voltage is induced between the steel plates 1, 2 and the electrodes 3, 4 as a result of the temperature at the welding point 5, which at first reduces gradually, at a specific rate.

From the thermoelectric voltage the temperature at the spot weld 5 is determined via a reference characteristic curve in which the temperature is indicated as a function of the thermoelectric voltage measured between the electrode 3, 4 and the welded plates 1, 2. If the composition of the metals of the electrodes 3, 4 and of the steel plates 1, 2 adjoining the electrodes 3, 4 is known, then the characteristic curve can possibly be read from the literature. The composition is often not known exactly, so that the reference curve is best determined from a reference welding operation. For that purpose, a highly accurate and normed thermocouple is disposed at the spot weld 5 and the temperature measured with that thermocouple can be associated with the thermoelectric voltage measured between the electrode 3, 4 and the metal sheet 1, 2.

Figure 2A:
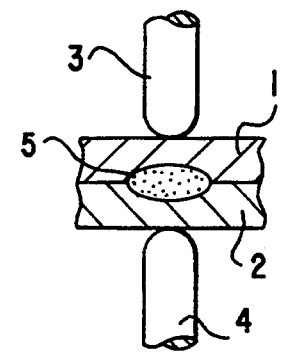
FIG. 2 is a typical diagram which permits a quality evaluation, along with two views similar to FIG. 1 on a reduced scale.
Figure 2:
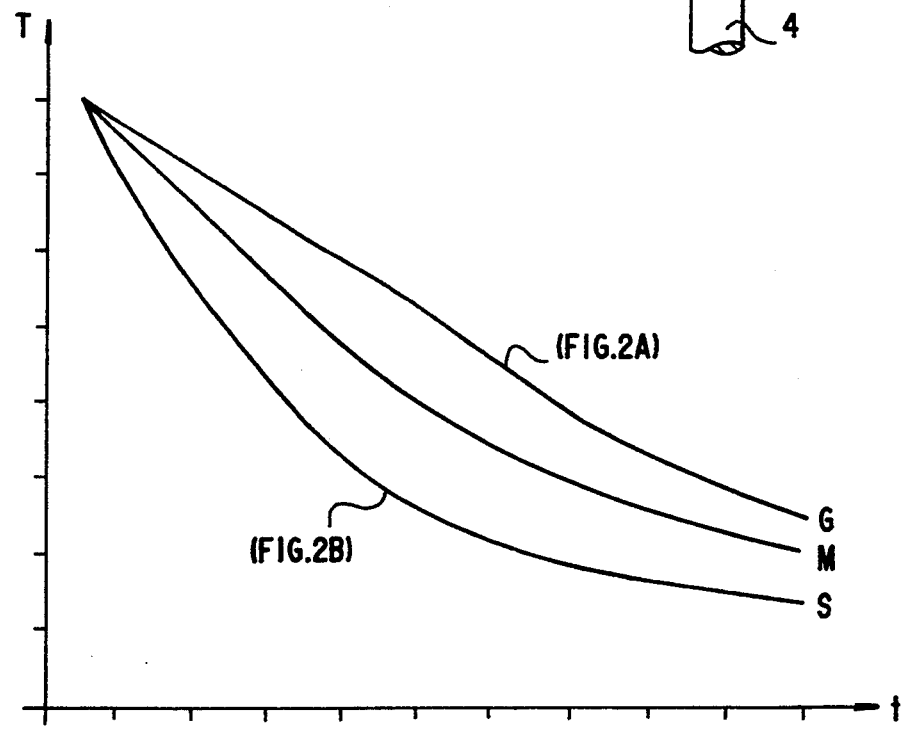
Figure 2B:
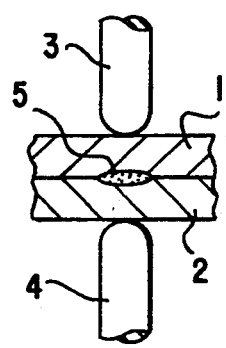

The thermoelectric voltage is measured at different points in time, but at least at two points in time $t_0$ and $t_1$, with the aid of the voltmeters 7, 8. If measurements are carried out at a large number of points in time, then, as is shown in FIG. 2, curves of the temperature drop can be drawn in each case for the individual welding processes, of which three can be regarded as being exemplary in this case and are shown marked by reference symbols G (for good), M (for medium) and S (for poor). As can be seen, the behavior of the curve G is approximately linear. In a central time region, it has a slight upwards bulge which is caused by the delay in the temperature drop because of the latent heat of solidification of a penetrating, completely satisfactory welding point 5, which is shown at the top right. The latent heat of solidification is released copiously in this temperature region. The curve S does not exhibit this feature so that it can be concluded that the welded joint is at least very incomplete, as is shown at the bottom left, and under some circumstances is even completely absent, since the curve has an approximately parabolic behavior. This indicates that cooling of steel plate parts which were admittedly heated but were not brought to fusion has taken place and was initially fast and became slower. For its part, the curve M delineates the bottom limit of welds which can be regarded as being just acceptable. Its behavior is determined by taking into account external parameters, for example the safety levels which were calculated in the dimensioning on the basis of the number and extent of the spot welds. Since the method proposed herein ensures that no faulty welds remain undiscovered, safety measures (for example in the form of additional spot welds that are intrinsically unnecessary in the case of perfect welding) which are provided in the structure of a workpiece can be reduced, which can lead to considerable savings. For practical purposes, a temperature measurement at only two points in time is sufficient in many cases, if the second point in time is selected in such a way that the spread of the different curves is as large as possible at the corresponding point of the diagram. If, furthermore, the determined temperature is too low with respect to the power used during the welding process, it can likewise be assumed that the welding is incomplete. If necessary, the determined temperature can be related in a known manner to a constant reference temperature, for example the environmental temperature, in a non-illustrated manner.

As can be seen by making reference to FIG. 3, beginning at the upper left of the figure, when the welding current, which is measured by means of the ammeter 6, falls to zero after completion of the welding process, this is used as a triggering signal for the initiation of the measurement for inspecting the quality of the spot weld. The signal is amplified and rectified in units 11 and 12. If required, for example if welding is carried out by using only the one half-cycle of an alternating current, frequency doubling also takes place in the unit 12. This is followed by DC isolation from the actual evaluation unit 18, which takes place in a unit 13. A peak detector 14 is used to determine the magnitude of the voltage threshold at the start of bringing the device into use, beyond which a welding process that can be evaluated is generally present. This value can be deleted for matching to different welding parameters, and then built up again. The input signal originating from the voltmeters 7, 8 is likewise amplified and is isolated at units 15, 16 and 17 in order to suppress parasitic signals. Both the triggering signal and the actual measurement signal are finally passed into the actual evaluation unit 18, a data-processing device in which the signals are correlated with various stored parameters, such as the welding current, welding duration, number and duration of the time intervals passing between detection of the individual measurements, reference curve for the functional relationship between the temperature and the thermoelectric voltage, and temperature/time curves of reference welding operations for the quality determination. A power supply 19 and a DC-DC converter 20 are connected to the units 15, 16 and 18. The result of the evaluation can then be indicated in a suitable manner as is shown in FIG. 2.

I claim:

1. A method for determining a temperature at a spot weld between parts to be welded to one another, whereby the parts are formed of at least a first metal and the spot weld is formed with an electrode of a second metal placed in contact with at least one of the parts, which comprises:
    measuring thermoelectric voltages between parts joined with a spot weld and electrodes for forming the spot weld brought into contact with the parts at opposite locations on opposite sides of the parts; and
    determining a temperature at the spot weld from a mean value of the thermoelectric voltages measured separately on each of the electrodes in the measuring step.

2. The method according to claim 1, which comprises determining a course of the temperature over time.

3. The method according to claim 2, which comprises recording the course of the temperature over time determined in the determining step.

4. A method for determining a temperature at a spot weld between parts to be welded to one another, whereby the parts are formed of at least a first metal and the spot weld is formed with an electrode of a second metal placed in contact with at least one of the parts, which comprises:
    measuring a thermoelectric voltage between parts joined with a spot weld and an electrode for forming the spot weld placed in contact with at least one of the two parts;
    determining a temperature at the spot weld from the thermoelectric voltage measured in the measuring step; and
    performing the measuring and determining steps at least twice at different times and assessing a quality of the spot weld from the temperatures determined at the at least two different times.

5. The method according to claim 4, which comprises:
    basing the quality assessment on values of a welding voltage and of a welding current measured during welding in conjunction with the course of the measured temperature drop; and assessing the quality to be poorer, the smaller a quotient of the determined temperature drop and a supplied power is.

6. The method according to claim 4, which comprises feeding a trigger signal used for starting a measurement of the thermoelectric voltage and a measured value of the thermoelectric voltage to an evaluation unit, and correlating the measured value with parameters stored in the evaluation unit.

7. A method for determining a temperature at a spot weld between parts to be welded to one another, whereby the parts are formed of at least a first metal and the spot weld is formed with an electrode of a second metal placed in contact with at least one of the parts, which comprises:
    measuring a thermoelectric voltage between parts joined with a spot weld and an electrode for forming the spot weld placed in contact with at least one of the two parts;
    determining a temperature at the spot weld from the thermoelectric voltage measured in the measuring step; and
    determining a course of the temperature over time for a discrete time period, assessing a quality of the spot weld from the course of the temperature over the discrete time period and assessing the quality of the spot weld to be worse, the faster the temperature decreases and the more the course of the temperature deviates from a straight line.

8. The method according to claim 7, which comprises:

basing the quality assessment on values of a welding voltage and of a welding current measured during welding in conjunction with the course of the measured temperature drop; and assessing the quality to be poorer, the smaller a quotient of the determined temperature drop and a supplied power is.

9. In an apparatus for producing spot-welding joints in parts being formed of at least a first metal by a welding electrode being formed of a second metal and being brought into contact with at least one of the parts to be welded to one another, a device for determining a temperature at a spot weld between the parts welded to one another, comprising:

a) a trigger emitting a signal upon completion of a welding process;
b) a time transmitter for defining a start and an end of at least one defined time interval after the emission of the signal upon completion of the welding process;
c) means for measuring a voltage connected between the welding electrode and the parts to be welded to one another; and
d) evaluation means for evaluating a course of the temperature at the spot weld over the defined time interval and for assessing a quality of the spot weld to be worse, the faster the temperature decreases and the more the course of the temperature deviates from a straight line.

10. The device according to claim 9, wherein said voltage measuring means are formed of a voltmeter.

* * * * *